United States Patent [19]

Jorgensen, Jr.

[11] 4,383,108

[45] May 10, 1983

[54] PRODUCTION OF EMULSION-POLYMERIZED BUTADIENE RUBBER IN POWDER FORM

[75] Inventor: August H. Jorgensen, Jr., Rocky River, Ohio

[73] Assignee: The B. F. Goodrich Company, Akron, Ohio

[21] Appl. No.: 288,226

[22] Filed: Jul. 29, 1981

[51] Int. Cl.$^3$ .................................................. C08J 3/16
[52] U.S. Cl. .................................... 528/485; 526/225; 528/487
[58] Field of Search ................... 260/29.7 SQ, 23.7 A, 260/23.7 M; 526/225; 528/485, 486, 487, 488

[56] References Cited

U.S. PATENT DOCUMENTS

| | | | |
|---|---|---|---|
| 2,469,827 | 5/1949 | Johnson | 528/485 |
| 2,561,256 | 7/1951 | Wilson | 528/485 |
| 2,576,909 | 12/1951 | Adams | 528/487 |
| 2,604,467 | 7/1952 | Crouch | 528/485 |
| 3,915,909 | 10/1975 | Schnoring | 528/487 |

Primary Examiner—Paul R. Michl
Attorney, Agent, or Firm—Ernest K. Bean

[57] ABSTRACT

There is disclosed a simple economical method of producing butadiene rubber, particularly NBR, in dry powder form free of extraneous material influencing its utility in rubber products manufacture. The method consists of preparing the butadiene rubber in latex form in the usual manner but using sodium lauryl sulfate or equivalent as emulsifier and then coagulating the latex with a combination of magnesium sulfate and aluminum sulfate, or their equivalents, in a molar ratio of Mg to Al in the range of 0.3 to 1 to 2 to 1. The coagulum wet cake obtained contains powder size particles of the rubber and is dried to give a dry free-flowing rubber powder, preferably after addition of zinc stearate or equivalent which functions as an anticake agent and prevents agglomeration of the powder size particles during drying. The zinc stearate can be added to the wet cake as dry powder or as a wet paste or produced in situ.

8 Claims, No Drawings

PRODUCTION OF EMULSION-POLYMERIZED BUTADIENE RUBBER IN POWDER FORM

BACKGROUND OF THE INVENTION

This invention relates to the production of emulsion-polymerized butadiene rubber in dry, free-flowing, finely-divided particulate or powder form and is directed to an improved and simplified method for obtaining such rubber in such form directly from the latex resulting from the emulsion polymerization. The method involves the use of special and critical techniques in preparing and coagulating the latex, preferably followed by special coagulum-treating procedures.

As is well known in the art, emulsion-polymerized butadiene rubber, such as the rubbery copolymers of butadiene-1,3 and acrylonitrile known as "nitrile butadiene rubber" or "NBR", is made by first polymerizing the monomers in aqueous emulsion in the essential presence of an emulsifying agent and a polymerization initiator (sometimes called a polymerization catalyst) together normally and desirably with various other additives affecting the polymerization or the properties of the rubber, to form an aqueous dispersion or liquid latex in which the solid dispersed phase is made up of microscopic rubber particles. The rubber is then obtained in dry solid form by coagulating the latex to produce a mass of coagulum, generally in the form of large crumbs or lumps (due to easy and rapid agglomeration or sticking together of the soft rubber particles as coagulation occurs), which is separated from the aqueous phase, dried and formed into sheets or bales. The baled rubber is supplied to rubber goods manufacturers where it is processed, compounded and vulcanized into finished rubber products.

Producers of NBR have recognized that processing operations in the rubber goods factory can often be facilitated and made less expensive and energy intensive by supply of the rubber in powder form. Consequently, several powder grades of NBR, produced by mechanically pulverizing or grinding the dry sheet rubber as produced in the usual manner, have been offered to the trade. Such powdered rubber is composed of discrete particles of "powder size" by which is meant a size in the range of about 0.3 to about 4 millimeters (mm) in greatest dimension (diameter) with average particle size (defined as the size at which 50 weight percent of the particles are smaller) of 0.5 to 2.0 mm. The rubber in this powder form can be processed and compounded by powder handling techniques and vulcanized to form finished rubber products of comparable properties, given a predetermined compounding recipe, as when starting with baled rubber and processing and compounding in the more conventional manner. However, the extra grinding step in the rubber production process proceeds slowly and consumes considerable energy requiring a premium price for the powder variety, which offsets to a substantial degree the savings in processing costs to the rubber products manufacturer. As a result such powdered rubbers have had only limited commercial acceptance and success.

Another known way to produce emulsion-polymerized butadiene rubber in powdered form is by spray drying the latex. This procedure is also slow and laborious and the powdered product contains all the solid ingredients present in the latex, including the water-soluble emulsifier used in the emulsion polymerization, and hence, is extremely water sensitive and water swellable. Spray dried powders are also often too fine to be handled except for dissolving in solvents to form adhesives, for example. These factors as well as other problems involved in the spray drying process have dictated against spray drying as a means for producing powdered butadiene rubber for general use in manufacture of finished rubber products.

There have also been proposals for producing powdered butadiene rubbers directly from a latex thereof by processes involving coagulation. Patents describing such processes include British Pat. Nos. 924,699; 924,700; 1,008,659 and 1,113,348; German Pat. Nos. 1,148,067; 1,204,404; 1,204,405 and 1,215,918; Japanese Pat. Nos. 54 (1979) 7448 and 7449 and U.S. Pat. Nos. 3,494,784; 3,573,227; 3,813,259; 4,119,759 and 4,269,740. In these processes, procedures are not as simple as desired and various additives are used in the coagulation such as various forms of silica and various harder-than-rubber synthetic resins and polymers which function to "partition" or "encapsulate" the soft rubber particles as coagulation occurs. These additives remain in the powdered rubber which would by supplied to rubber products manufacturers and since they are dissimilar to rubber and to conventional rubber compounding ingredients, their presence is not generally desired.

The background of the invention gives no indication of how butadiene rubber could be easily produced in dry powder form without substantially increasing energy usage and without substantially affecting its utility by manufacturers of rubber products.

SUMMARY OF THE INVENTION

This invention provides a convenient economical method of producing, by coagulation of a latex resulting from emulsion polymerization, a coagulum consisting of particles of butadiene rubber of a size comparable to that of the particles in a butadiene rubber powder produced by grinding. It also provides methods for preventing agglomeration of the coagulated powder-size particles without introducing extraneous materials which are unwanted or deleterious in finished rubber products made from the powder. Thus, it enables production of "coagulated" powdered butadiene rubber with all the advantages of "ground" powdered butadiene rubber without incurring the considerable expense of grinding.

The method for producing powder-size coagulated particles directly from latex involves the novel combination of two distinct and critical steps. The first step is the use, as the emulsifier in the polymerization to form the latex, of an alkali metal alkyl sulfate or equivalent and the second step is the use, as the coagulant in the coagulation of the latex, of an aqueous solution containing both an aluminum salt such as aluminum sulfate (alum) and a magnesium salt such as magnesium sulfate in critical proportions. It has been found that this particular coagulant does not completely destroy the surface activity of this particular emulsifier and the residual surface activity serves to prevent agglomeration of the coagulated powder size rubber particles as they form and during their subsequent separation from the surrounding serum. The result is a "wet cake" made up of the powder size particles wetted with water.

Drying of the wet cake into dry powder while retaining the desired powder particle size (i.e., without particle agglomeration) can be effected without addition of extraneous material by a controlled drying procedure in which the particles are kept in continual motion surrounded by drying air. It is preferably, however, in order to facilitate drying of the wet cake without particle agglomeration, that zinc stearate or equivalent soap be added to the wet cake in a solids mixer such as a ribbon blender before drying. The zinc soap acts as an anticaking agent and is preferably either added in the form of a wet paste produced by precipitating an alkali metal soap solution with zinc sulfate followed by filtering, or formed "in situ" by mixing the wet cake with alkali metal soap solution in a first mixer and adding a solution of zinc sulfate to precipitate the zinc stearate in a second mixer arranged with the first in series. In any event, the free-flowing powdered rubber produced in drying of the wet cake substantially retains the original coagulum particle size and the only extraneous material, if any, present in significant proportion is the zinc stearate, or equivalent, anticaking agent, the use of which in rubber compounding is conventional and the presence of which in rubber products is well known not to be unwanted or significantly deleterious.

DETAILED DESCRIPTION OF THE INVENTION

Preparation of Latex

In practice of this invention it is critically necessary that the desired butadiene rubber first be present in latex form as prepared by aqueous emulsion polymerization of the required monomer(s) using to emulsify the monomer(s) in the aqueous medium, i.e. as emulsifier, an effective amount of an alkali metal salt, or soap, of sulfuric acid derivative in which a long hydrocarbon chain (10 to 20 or more carbon atoms) replaces one only of the hydrogen atoms of the sulfuric acid molecule, i.e., an alkali metal alkyl sulfate such as sodium lauryl sulfate, sodium myristyl sulfate, sodium cetyl sulfate, potassium dodecyl sulfate or the like or mixtures thereof, or similar alkali metal salts in which the long hydrocarbon chain contains unsaturation as in sodium oleyl sulfate, sodium linoleyl sulfate or the like. Such salts, or soaps, are well known to be surface active agents and have been suggested as emulsifiers in emulsion polymerization but have been seldom, if ever, actually used in aqueous emulsion polymerization to yield commercial butadiene rubber, other emulsifiers, particularly fatty acid or rosin acid soaps, being normally used especially when the latex is to be converted to solid rubber rather than used as such. The amount of the emulsifier is generally in the range of 1 to 5 parts per 100 parts of monomer and 0.1 to 5 parts per 100 parts water.

The monomer material polymerized in aqueous emulsion in the presence of the critical emulsifier to give the starting latex for the invention, and all other ingredients needed for the latex production, as well as the proper polymerization and post polymerization conditions and procedures, can be varied widely in accordance with the kind, type or grade of rubber desired, as is well known to those skilled in the art. Since NBR (prepared by aqueous emulsion polymerization of a monomer mixture of butadiene-1,3 with acrylonitrile) is presently supplied in powder form (produced by pulverizing or grinding or spray drying procedures) production thereof in accordance with this invention is of special importance, it is preferred that the monomeric material used in the emulsion polymerization to give the starting latex consist of these monomers. It is understood, however, that the precise nature of the monomeric material is not critical so long as a rubber latex is formed. Thus the monomeric material may consist of any of the butadiene-1,3 hydrocarbons, including not only butadiene-1,3 itself but also 2-methyl butadiene-1,3 (isoprene), 2,3 dimethyl butadiene-1,3, 2-ethyl butadiene-1,3 or the like, either alone or in admixture with each other or with lesser amounts of one or more other monomers copolymerizable therewith (comonomers). Suitable comonomers in addition to the preferred acrylonitrile include its homologs; styrene (in which event the butadiene rubber is "SBR") or its homologs; alkyl acrylates and methacrylates and numerous other compounds containing a single vinyl or vinylidene group, as is well known to the art. Small amounts of a comonomer containing more than one vinyl or vinylidene group in nonconjugated relation such as divinyl benzene may also be present as in the known "crosslinked" SBR and NBR but because crosslinked rubbers are less prone to agglomeration than linear rubbers the invention is of most value when the butadiene rubber being produced in powder form is completely linear in polymer structure.

Polymerization of the monomeric material using the critical emulsifier to form the starting latex is carried out in the conventional manner by forming a solution of the emulsifier in water, emulsifying therein the monomeric material and the essential polymerization initiator or catalyst, which is generally a free radical generating peroxygen compound, together generally with various other additives for the polymerization, to form an aqueous emulsion, and then agitating the emulsion in a closed polymerization reactor for a time and at a temperature sufficient for the polymerization to proceed to the point where from about 70 to 95% of the monomeric material is converted into polymer, with the temperature varying from about 5° to 50° C. and the time varying from about 3 to 24 hours or longer depending on the precise degree of conversion and ingredients present. The polymerization is then terminated through addition of a polymerization terminator or "shortstop", unreacted monomer removed and the rubber particles in the latex stabilized against subsequent deterioration by addition of an emulsified antioxidant or stabilizer. The latex is then ready for removal from the polymerization reactor into a tank for coagulation.

Table I sets forth a typical recipe and conditions for producing a starting latex for this invention. The recipe is conventional for polymerization to form NBR at low temperature using a "redox activator", except for the fact that it employs the critical emulsifier instead of fatty acid and/or rosin acid soap. As will be apparent from the notes to the Table the various factors involved can be varied widely.

TABLE I

| Material | Function of Material | Weight Proportion | Notes |
|---|---|---|---|
| Butadiene-1,3 | Primary monomer | 70 | (a) (b) |
| Acrylonitrile | Comonomer | 30 | (a) (b) (e) |
| Soft water | Polymerization (pmz) medium | 195.0 | (b) |
| Sodium lauryl sulfate | Critical emulsifier | 2.5 | (b) |
| Cumene hydroperoxide | pmz initiator or catalyst | 0.15 | (c) |

TABLE I-continued

| | | | |
|---|---|---|---|
| Sodium alkyl naphthalene sulfonate formaldehyde condensate | (a peroxygen compound) wetting agent | 0.10 | (c) |
| Sodium salt of ethylene diamine tetraacetic acid (EDTA) | components of "redox activator" | 0.1 | (c) |
| Sodium iron salt of EDTA | | 0.1 | (c) |
| Sodium formaldehyde sulfoxylate | | 0.1 | (c) |
| Tert-dodecyl mercaptan | pmz modifier or molecular weight regulator | 0.68 | (c) (e) |
| Hydroxy ammonium sulfate | shortstop or pmz terminator | 0.12 | (c) (d) |
| Phosphited polyalkyl phenol | antioxidant for rubber | 1.50 | (c) (d) |

| Conditions | |
|---|---|
| Polymerization temperature | 5° C. |
| Polymerization time | 13 hours |
| Conversion | 88% |

| Final Latex | | |
|---|---|---|
| % total solids | 30–40% | (b) |
| pH | 8–9.5% | |
| % bound acrylonitrile in rubber | 30–32% | (a) |
| Viscosity of rubber (ML-212° C.) | 55–70 | (f) |

NOTES
(a) relative proportions of butadiene-1,3 and acrylonitrile variable so long as butadiene-1,3 predominates, giving a rubber.
(b) amount of water and emulsifier dependent on amount of monomers and desired total solids content of latex. About 150 to 500 parts water and 1 to 5 parts emulsifier each per 100 parts of monomeric material are normally used to give total solids content in the latex in the range of about 15 to 40%.
(c) the recited function is performed by other specific ingredients, as is well known; any suitable small proportion which performs the function may be used.
(d) ingredient added after polymerization; if antioxidant added before polymerization, longer polymerization time is required.
(e) a portion of one or more of these ingredients is often added in stages during the polymerization.
(f) determined in sample of rubber as normally separated from latex.

Coagulation of Latex

It is essential in this invention in order to produce a coagulum of powder particle size (0.3 to 4.0 mm) that the coagulant admixed with the latex be an aqueous solution containing a water-soluble aluminum salt preferably the sulfate (i.e., alum) together with, in the same or separate aqueous solution, preferably the former, a water-soluble magnesium salt preferably the sulfate (i.e., Epsom salts) using in the coagulant a molar ratio of Mg to Al in the range of 0.3 to 1 to 2 to 1 depending upon the exact nature of the critical emulsifier and the particular rubber in the latex. For example, a 0.5 to 1 to 1 to 1 Mg/Al ratio is most desired when the emulsifier is sodium lauryl sulfate while a higher Mg/Al ratio is preferred with sodium oleyl sulfate and a lower Mg/Al ratio with odium stearyl or cetyl sulfate and the Mg/Al ratio is preferably higher the higher the acrylonitrile content of the rubber and the lower its Mooney viscosity. The total amount of coagulant is related to the rubber content of the latex and should preferably be in the range of about 0.04 to 0.09 molar equivalents of coagulant salts in the solution per hundred parts of rubber (ephr) with the coagulant salts dissolved in about 50 to 300 weight parts water per part coagulant salt to give the coagulant solution. The temperature at which the coagulation occurs also influences the particle size of the coagulum to an extent and should preferably be in the range of 60° to 80° C.

The following Examples demonstrate the criticality of the latex-coagulant combination and illustrate the effect of varying the amounts and ratios of the critical coagulant and the coagulation conditions. In all Examples parts are by weight.

EXAMPLE 1

In this Example, an NBR latex prepared by polymerization of butadiene and acrylonitrile in aqueous emulsion using sodium lauryl sulfate as emulsifier in accordance with Table I is coagulated with an aqueous solution containing dissolved $MgSO_4.7H_2O$ and $Al_2(SO_4)_3$. The latex has a total solids content of 34.6%, a pH of 8.0 and the NBR present in the latex has a bound acrylonitrile content of 34.6% and a Mooney viscosity (ML-4-212) of 61. This latex in an amount of 100 parts is added with agitation to 870 parts of aqueous coagulant solution containing 4.4 phr of $MgSO_4.7H_2O$ and 2.2 phr $Al_2(SO_4)_3$ at a temperature of 60° C. Coagulation occurs to produce particles of rubber surrounded by clear aqueous serum which is drained off leaving a wet cake which is washed and filtered through muslin without applying pressure to the wet cake. The particles of rubber in the wet cake are observed to be of fine powder size, of the order of 0.3 to 1.0 mm particle size. However, when in a "control" coagulation in the same manner except that the coagulant solution contains only $MgSO_4.7H_2O$ in amounts up to 8.7 phr, the coagulum appears like latex in which the particles are less than 100 microns in size and cannot be separated as a powder. This is in contrast to use of $MgSO_4.7H_2O$ to coagulate normal latices in which the emulsifier is a fatty acid and/or rosin acid soap since in that case the coagulum is of crumb size at least of the order of 1/16th to ⅛th inch, much too large to be separated as powder. This is also the case when in another "control" the same latex containing sodium lauryl sulfate as emulsifier is coagulated in the same manner as in the Example using a coagulant solution containing 4.3 phr of $Al_2(SO_4)_3$. Thus, this Example shows that it is necessary to use a latex containing the critical emulsifier of this invention and to coagulate with a solution containing the critical combination of aluminum salt and magnesium salt of this invention, in order to prepare directly from the latex a coagulum of powder-size particles.

EXAMPLES 2 to 11

In these Examples a latex similar to the latex used in Example 1, having a solids content of 32.6%, a pH of 9.7 and in which the emulsified rubber has a bound acrylonitrile content of 31% and a Mooney viscosity (ML-4-212) of 55, is coagulated with dilute aqueous coagulant solution using varying amounts of $Al_2(SO_4)_3$ and $MgSO_4.7H_2O$ as dissolved coagulants and varying the coagulation procedure as shown in Table II. The coagulum wet cake obtained in each case is washed, filtered and dried into powder in the same identical manner. The particle size distribution of the dried powder is determined by screening analysis using standard U.S. mesh screen opening sizes. Particles passing a 6 mesh screen are below 3.3 mm in size; those passing a 10 mesh screen are below 2.0 mm and those passing an 18 mesh screen are below 1.0 mm. Table II demonstrates that when sodium lauryl sulfate is the emulsifier in the latex, highest percentage of particles below 2.0 and 1.0 mm, which is desired in powdered rubber, results when using 0.05 to 0.09 ephr of combined coagulants added simultaneously at a Mg/Al molar ratio of 0.3 to 1 to 1 to 1 and coagulating at a temperature of 60°–80° C.

wet cake containing powder size particles, in a solids mixer such as a ribbon blender or, more preferably, since dry powdered zinc stearate is expensive and an explosion hazard, a wet paste of zinc stearate, as easily obtained by mixing a water solution of an alkali metal salt of stearic acid, potassium stearate, for example, with a water solution of zinc sulfate to precipitate zinc stearate followed by filtering, is mixed with the rubber wet cake in an internal mixer. The zinc stearate may also be formed "in situ" by mixing the wet cake of powdered rubber with the solution of alkali metal salt of stearic acid in a first internal mixer followed by adding the zinc sulfate to the resulting mass in a second internal mixer in series with the first. In either event, the zinc stearate functions as an anticake and subsequent drying of the wet powdered rubber can be effected in any conventional manner without significant agglomeration of the particles in the powdered rubber.

Generally equivalent results are secured by using, in place of zinc stearate, zinc soaps of other fatty acids containing from 8 to 20 or more carbon atoms, or mixtures thereof, but this offers no particular advantage.

The following Examples illustrate the preparation of dry powdered rubbers containing various anticake agents, including the preferred zinc stearate, and various methods of incorporating the preferred zinc stearate anticaking agent in the powdered rubber produced by the critical coagulation.

TABLE II

| Examples | Total $MgSO_4.7H_2O$ + $Al_2(SO_4)_3$ coagulants (ephr) | Molar Ratio Mg/Al | Order of addition of coagulants | Temperature coagulation washing °C. | Particle size of powder percent below | | |
|---|---|---|---|---|---|---|---|
| | | | | | 3.3 mm | 2.0 mm | 1.0 mm |
| 2 | 0.05 | 50/50 | simultaneous | 40 | 69 | 33 | 4 |
| 3 | 0.05 | 50/50 | " | 60 | 80 | 62 | 42 |
| 4 | 0.05 | 50/50 | " | 80 | 90 | 80 | 33 |
| 5 | 0.05 | 50/50 | Mg salt first | 80 | 60 | 52 | 32 |
| 6 | 0.05 | 25/75 | simultaneous | 80 | 94 | 72 | 26 |
| 7 | 0.05 | 38.5/61.5 | " | 80 | 94 | 82 | 38 |
| 8 | 0.05 | 75/25 | " | 80 | 64 | 24 | 3 |
| 9 | 0.084 | 50/50 | " | 80 | 99 | 79 | 20 |
| 10 | 0.065 | 50/50 | " | 80 | 94 | 81 | 38 |
| 11 | 0.025 | 50/50 | " | 80 | 31 | 16 | 6 |

Isolation of Dry Powdered Rubber

The coagulum obtained as wet cake through the coagulation step of this invention may be washed and dried in an air stream with the particles in motion, or in any other carefully controlled manner, to give dry powdered rubber free of other ingredients. When using commercial drying equipment it has been found preferred that the wet cake be mixed with 1 to 10 phr of a zinc soap, especially zinc stearate, before final drying. This prevents undue agglomeration of the powder-size particles in the coagulum during drying, and functions as an anticaking agent in the dry powdered rubber. It also insures that the powdered rubber, as supplied to the rubber products manufacturer contains no extraneous materials other than the zinc soap, which is particularly advantageous in the case of zinc stearate when the butadiene rubber is vulcanized with sulfur since the compounding recipe contains zinc oxide and stearic acid, which give zinc stearate and there is therefore no need for the rubber products manufacturer to make significant changes in normal compounding recipes when using the powdered butadiene rubber.

The zinc stearate in its dry powdered state may be mixed with the rubber coagulum while in the form of

EXAMPLES 12 to 16

In these Examples an NBR latex as described in Table I and Examples 2 to 11, in the amount of 2454 parts, is added with vigorous agitation to a coagulating tank containing 25 parts $MgSO_4.7H_2O$ and 18 parts $Al_2(SO_4)_3$ dissolved in 7500 parts of water at 80° C. After agitation for 5 minutes, the contents of the tank are allowed to settle whereupon there is obtained solid NBR rubber coagulum of powder particle size in a clear water serum which is drained off or removed by filtering without applying pressure to the coagulum particles. 7500 parts of 80° C. water is then added with agitation for 10 more minutes and the washed coagulum filtered through muslin. The filtered wet powder size particles of rubber coagulum are transferred to a ribbon blender and there mixed for 2.5 minutes with the amount of various anticake agents shown in Table III. Each mixture is then air dried in a National Air Dryer with 220° F. air and the condition of the dry product observed, as also indicated in Table III. The Table shows that the only product in which there was no easily apparent agglomeration of the powder size rubber particles during drying is the product of Example 12 containing the zinc stearate anticake agent. This product after mixing for 1 minute in a Waring blender with 3 phr of zinc stearate coated magnesium silicate known as "Mistron ZSC", which further prevents agglomeration of particles even on storage of powdered rubber, has over 96% of its particles passing a 10 mesh screen (below 2.0 mm) and is ready for supply to rubber products manufacturers as a complete substitute for commercially available ground variety of NBR of similar acrylonitrile content and Mooney viscosity.

TABLE III

| Example | Anticake agent | phr | Condition of dried powdered rubber |
|---|---|---|---|
| 12 | Impalpable zinc stearate powder | 3.0 | finely-divided free-flowing powder, indicating no agglomeration of particles on drying |
| 13 | Magnesium silicate powder ("Mistron Vapor") | 3.0 | coarser free-flowing powder indicating appreciable agglomeration on drying |
| 14 | same | 5.0 | same as Example 13 |
| 15 | zinc stearate coated magnesium silicate powder ("Mistron ZSC") | 20.0 | slightly coarse free-flowing powder some agglomeration on drying |
| 16 | Bentonite clay | 3.0 | coarse, free-flowing power indicating agglomeration on drying |

EXAMPLES 17 to 20

In these Examples the procedure of Examples 12 to 16 is followed to the point of obtaining powder size particles of rubber coagulum. In each Example 3 phr of zinc stearate or other zinc soap anticake is then incorporated into the wet cake of rubber in the manner indicated in Table IV and the product dried as in Example 12. In each case the product is a dry free-flowing powder. Table IV also shows for the dried powder of each Example the percentage of particles passing a 6 mesh screen (below 3.3 mm).

TABLE IV

| Example | Manner of zinc soap addition | Percent particles below 3.3 mm |
|---|---|---|
| 17 | wet paste prepared by mixing aqueous potassium stearate with aqueous $ZnSO_4.H_2O$ to give wet paste containing 20% total solids zinc stearate. The wet paste mixed with rubber coagulum wet cake in ribbon blender for 5 minutes; mixture dried in air oven at 220° F. | 96 |
| 18 | Same as Example 17 except using potassium oleate in place of potassium stearate | 83 |
| 19 | Zinc soap formed "in situ" by adding potassium stearate solution to rubber coagulum wet cake in first ribbon blender, then adding $ZnSO_4.H_2O$ solution in second ribbon blender. Mixture dried as in Example 17. | 82 |
| 20 | Same as Example 19 except potassium soap of C16 fatty acid mixture used in place of potassium stearate | 93 |
| 21 | Same as Example 19 except potassium oleate in place of potassium stearate | 85 |

When dry powdered rubber produced in accordance with this invention is compounded by powder mixing in a conventional compounding recipe containing for example, 100 parts rubber, 5 parts zinc oxide, 1 part stearic acid, 40 parts filler (e.g., carbon black), 2 parts antioxidant (e.g., an alkylated phenol), 0.3 parts sulfur curing agent and 2.5 parts tetramethyl thiuram disulfide accelerator; the compound then cured and the cured vulcanizate subjected to the usual testing procedures, including tests measuring extrusion characteristics, stress-strain characteristics, "scorch" time, abrasion characteristics, compression set, and resistance to oils, and water, it is found that the vulcanized properties are in all respects satisfactory and equivalent to those obtained with the same rubber as conventionally produced and compounded. The advantage of the simple method of producing powdered butadiene rubber made by emulsion plymerization provided by this invention over the energy-intensive "slab grinding" procedure is apparent.

I claim:

1. In the production of solid butadiene rubber by polymerizing a monomeric material comprising predominantly a butadiene-1,3hydrocarbon while emulsified in an aqueous medium thereby to form a latex containing dispersed microscopic particles of said rubber, coagulating the latex to form a solid coagulum of said rubber and separating said coagulum as a dry powder from the surrounding coagulum, the method which comprises the steps, in combination, of (a) using sodium lauryl sulfate as emulsifier in the polymerization to form the latex and (b) admixing the latex with an aqueous coagulating solution composed of dissolved magnesium sulfate and aluminum sulfate in a molar ratio of magnesium to aluminum in the range of 0.3/1 to 2/1, thereby to produce a solid coagulum in the form of a powder whose particles are from about 0.3 to about 4 millimeters in greatest dimension.

2. The method of claim 1 wherein the solid butadiene rubber produced in dry powder form is a copolymer of butadiene-1,3 with a lesser amount of acrylonitrile.

3. The method of claim 1 wherein the amount of magnesium sulfate and aluminum sulfate combined used in step (b) is from 0.04 to 0.09 molar equivalents per 100 parts of the rubber contained in the latex produced in step (a).

4. The method of claim 1 wherein the coagulation of step (b) is carried out in simultaneous presence of both magnesium sulfate and aluminum sulfate at a temperature in the range of 60° to 80° C.

5. The method of claim 1 further characterized in that the coagulum produced by the combination of steps (a) and (b) in the form of a wet cake of rubber particles of powder size is mixed with 1 to 10 parts per hundred of rubber a zinc soap before drying into powder.

6. The method of claim 5 wherein the zinc soap mixed with the wet cake is in the form of a wet paste produced by precipitating an aqueous solution of an alkali metal salt of a fatty acid soap with zinc sulfate.

7. The method of claim 1 wherein the solution of alkali metal salt of fatty acid is first added to the wet cake and the zinc sulfate added thereafter to precipitate the zinc soap and incorporate it into the wet cake in situ.

8. The method of claim 5 wherein the zinc soap is zinc stearate.

* * * * *